Feb. 7, 1933. G. C. MATE ET AL 1,896,966
SLED BRAKE
Filed April 12, 1932 2 Sheets-Sheet 2
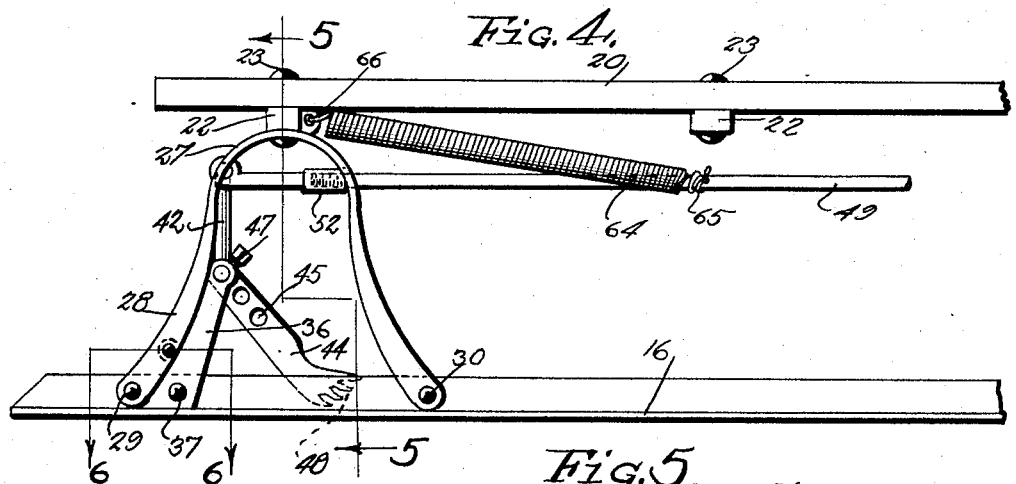
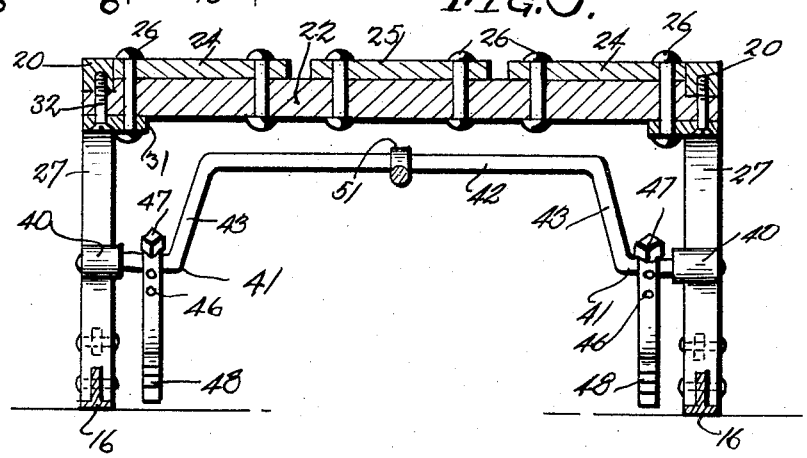
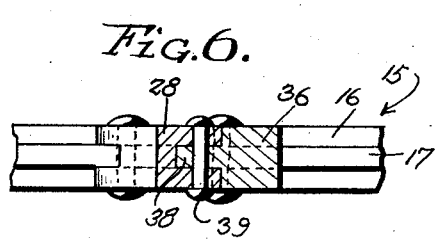
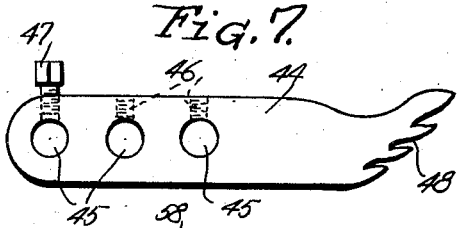
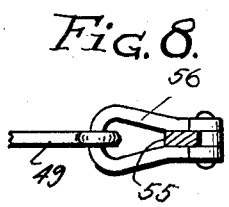
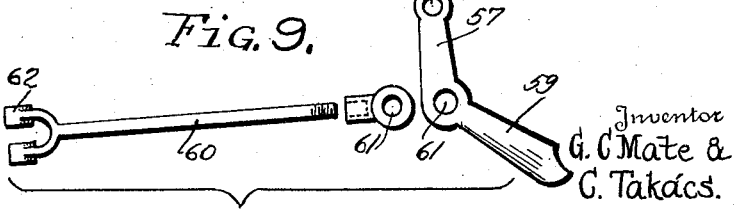

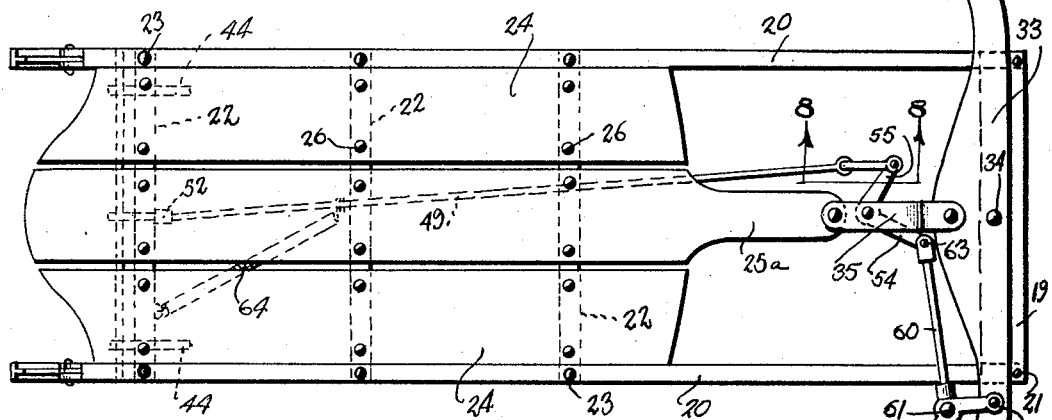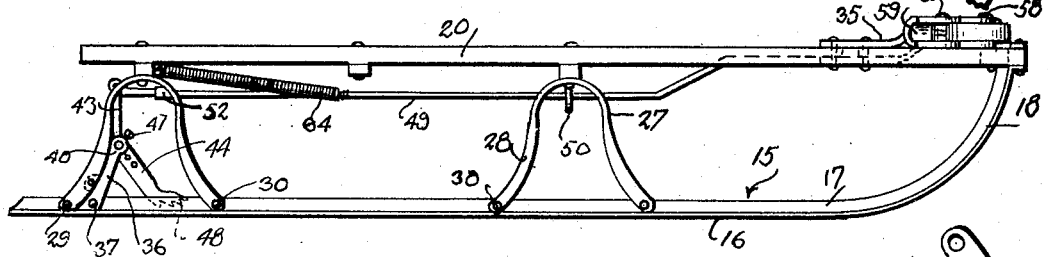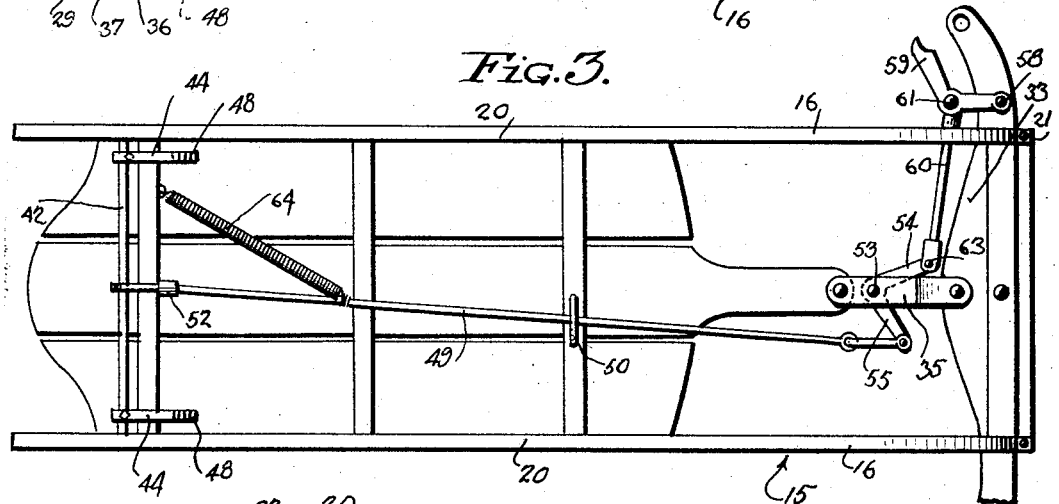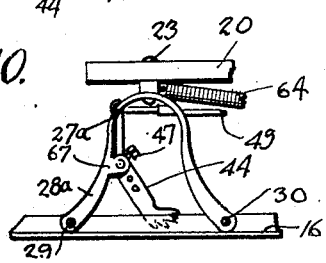

Patented Feb. 7, 1933

1,896,966

UNITED STATES PATENT OFFICE

GUS C. MATE AND CHARLES TAKÁCS, OF CLEVELAND, OHIO, ASSIGNORS OF THIRTY-FIVE PER CENT TO SAID GUS C. MATE AND SIXTY-FIVE PER CENT TO SAID CHARLES TAKÁCS

SLED BRAKE

Application filed April 12, 1932. Serial No. 604,812.

This invention relates to certain new and useful improvements in sled brakes.

The primary object of the invention is to provide a sled brake of a character that may be associated with sleds of standard construction and also embodied in the original manufacture of the sled and including a brake shoe associated with each runner adjacent its rear end and operated by a foot or hand lever conveniently mounted upon the usual cross-steering handle or bar at the front end of the sled.

A further object of the invention is to provide a brake for sleds embodying comparatively few parts, being inexpensive to manufacture and easy to operate with the brake shoes adjustably mounted to accommodate the brake mechanism to sleds of different sizes.

With the above and other objects in view that will become apparent as the nature of the invention is better understood, the same consists in the novel form, combination and arrangements of parts hereinafter more fully described, shown in the accompanying drawings and claimed.

In the drawings:—

Figure 1 is a top plan view of a sled equipped with the improved brake devices showing the foot or hand operated lever for the brake devices mounted upon the cross steering bar or handle at the front end of the sled;

Figure 2 is a side elevational view showing the inoperative position of the brake shoes with respect to the sled runners;

Figure 3 is a bottom plan view of the sled and brake devices;

Figure 4 is an enlarged fragmentary side elevational view of the rear end of the sled showing the mounting for the brake shoes and crank shaft associated therewith;

Figure 5 is a vertical cross-sectional view taken on line 5—5 of Figure 4, showing the transverse crank shaft for the support of the brake shoes;

Figure 6 is a detail sectional view taken on line 6—6 of Figure 4;

Figure 7 is a side elevational view of one of the brake shoes showing the spaced openings therein providing adjustable mounting for the brake shoes;

Figure 8 is a detail sectional view taken on line 8—8 of Figure 1;

Figure 9 shows elevational views of the foot or hand operated devices for the brake mechanism; and Figure 10 is a fragmentary side elevational view showing another form of mounting for the brake shoe and crank shaft directly associated therewith.

Referring more in detail to the accompanying drawings, the sled comprises a pair of side runners 15 T-shaped in cross-section with the cross head 16 thereof constituting the runner face while the center leg or rib 17 extends upwardly as illustrated. The forward ends of the runners 15 curve upwardly as at 18 with the upper terminal ends thereof connected by a cross bar 19.

The sled body includes parallel side rails 20 secured at their forward ends as at 21 to the upper curved ends 18 of the runners 15 and to the cross bar 19, the side rails 20 being maintained in spaced parallel relation by the spaced cross bars 22 secured at their ends as at 23 to the undersides of the side rails 20. Slats or boards 24 and 25 are secured as at 26 to the cross bars 22 to form the complete body of the sled, the center board 24 projecting forwardly of the side boards 24 for attachment to the steering devices and brake mechanism of the sled.

Spring devices are interposed between the sled body and runners 15 rearwardly of the front end of the runners and include inverted U-shaped spring straps 27 having channel legs 28 bifurcated at their lower ends as at 29 to straddle the perpendicular rib 17 of the adjacent runner 15 to be retained in engagement with the rib by the cross bolt or rivet 30. The upper ends of the spring straps 27 have lateral offsets 31 as shown in Figure 5 and through which offsets, an adjacent bolt 26 passing through a board 24 and cross bar 22 passes, the spring strap being further anchored to the sleigh body by screws 32 passing upwardly therethrough and entering the side rails 20.

A transverse steering bar or handle 33 is pivotally mounted as at 34 upon the cross bar 19 connecting the front ends of the runners 15 and the central portion of the steering bar 33 rearwardly of the pivot 34 is connected by a pair of spaced links 35 to a forwardly projecting arm 25a carried by the center board 25 of the sled body.

The brake devices as shown in Figures 1 to 9 include a stand bracket 36 arranged adjacent each rearwardly positioned spring strap 27, the lower end of the stand bracket 36 being bifurcated to straddle the perpendicular rib 17 of the runner 15 and to be retained in engagement therewith by the cross bolt or rivet 37, the stand bracket 36 being juxtaposed to the rear leg 28 of the spring strap. As shown in Figure 6, an offset lug carried by the stand bracket 36 projects into the channel leg 28 and a cross bolt or rivet 39 passing through the channel leg and lug further anchors the stand bracket in position. The upper end of the stand bracket 36 is provided with a bearing 40, the stand bracket 36 being transversely aligned on the opposite runner 15 with the bearings 40 rotatably receiving the ends 41 of a cross shaft 42 having offset crank portions 43 carrying the shaft ends 41.

The brake shoe 44 shown in detail in Figure 7 is mounted on the end 41 of the shaft inwardly of the runners 15 and is provided with a series of spaced openings 45 to permit adjustable mounting of the brake shoe, a threaded opening 46 being associated with each bearing opening 45 for the reception of a binding screw 47 to rigidly mount the brake shoe upon the shaft end 41. The lower operative end of the brake shoe 44 is roughened, corrugated or toothed as at 48 to increase ice, snow and ground gripping action thereof.

The operating mechanism for the brake shoes 44 and cross shaft 42 includes a link rod 49 extending longitudinally of the sled beneath the body thereof, the link rod 49 passing through a guide loop 50 depending from one of the cross bars 22 with the rear end thereof having a bearing connection 51 centrally of the cross shaft 42, the rear end of the link rod 49 including a turn-buckle device 52 for lengthwise adjustment of the link rod. A bell crank lever is pivotally mounted as at 52 between the links 35 connecting the steering bar 33 and the center board extension 25a and includes angle legs 54 and 55, the outer end of the leg 55 of the bell crank lever having a link connection 56 with the forward end of the link rod 49. The operating means of the leg 54 of the bell crank lever is supported upon one end of the steering bar 33 and as shown in detail in Figure 9 and applied in Figure 1, includes a forked leg 57 straddling the steering bar 33 and pivotally mounted thereon as at 58. A handle extension 59 is carried by the forked leg 57 and an operating rod 60 is pivotally engaged with the forked leg 57 as at 61, the other end of the operating rod 60 being forked as at 62 and pivotally connected as at 63 to the free end of the bell crank lever leg 54. The brake shoes 44 are normally retained in an elevated inoperative position with respect to the runners and ground line by the coil spring 64 anchored at one end as at 65 to the link rod 49 and at its other end to the lug 66 carried by the rear cross bar 22.

From the above detailed description of the invention, it is believed that the construction and operation thereof will at once be apparent, it being noted that the steering bar 33 may be operated for the steering of the sled and only impart a minor movement to the brake mechanism without rendering the latter effective, the brake shoes 44 being applied by pressure upon the handle 59 for moving the bell crank lever for the forward projection of the link rod 49 and cross shaft 42 for rotating the shaft ends 41 in the bearings 40 to lower the brake shoes into ground engagement.

In the form of invention illustrated in Figure 10, the spring straps 27a have the side legs 28a of channel formation, with an offset flange 67 forming a bearing for the ends 41 of the cross shaft 42. The sled brakes illustrated in Figures 1 to 9 may be applied to sleds of standard construction while in the form of invention illustrated in Figure 10, the stand bracket 36 may be eliminated in the initial manufacture of the sled and the spring strap 27a designed with the offset 67 for the support of the shaft that carries the brake shoes.

While there are herein shown and described the preferred embodiments of the invention, it is nevertheless to be understood that minor changes may be made therein without departing from the spirit and scope of the invention as claimed.

We claim :—

1. A brake for sleds, wherein the sled includes T-runners, a platform body and means supporting the body above the runners, said brake comprising a cross-shaft having crank ends directed outwardly to form trunnions, stand-brackets rising from the runners and having bearings at their upper ends for the support of the trunnions, a bracket shoe fixed to each trunnion, a tensioned link rod connected to the cross shaft, link and lever devices connected to the forward end of the link rod for operating the cross shaft to lower the brake shoes to operative positions, the sled including a transverse forward steering bar, a pair of links connecting the steering bar to the sled body, and the link and lever devices including a bell crank pivotally supported on said pair of links.

2. A brake for sleds, wherein the sled includes T-runners, a platform body and means supporting the body above the runners, said brakes comprising a cross-shaft having crank ends directed outwardly to form trunnions, stand-brackets rising from the runners and having bearings at their upper ends for the support of the trunnions, a bracket shoe fixed to each trunnion, a tensioned link rod connected to the cross shaft, link and lever devices connected to the forward end of the link rod for operating the cross shaft to lower the brake shoes to operative positions, the sled including a transverse forward steering bar, a pair of links connecting the steering bar to the sled body, the link and lever devices including a bell crank pivotally supported on said pair of links, and a manually operated lever pivoted on the steering bar and having a rod connection with the bell crank.

In testimony whereof we affix our signatures.

GUS C. MATE.
CHARLES TAKÁCS.